United States Patent [19]

Mihalik et al.

[11] Patent Number: 4,574,354
[45] Date of Patent: Mar. 4, 1986

[54] METHOD AND APPARATUS FOR TIME-ALIGNING DATA

[75] Inventors: Michael A. Mihalik, Beaverton; Gerd H. Hoeren, Lake Oswego; Michael G. Reiney, Tigard; James J. Besemer, Portland; Steven R. Palmquist, Beaverton, all of Oreg.

[73] Assignee: Tektronix, Inc., Beaverton, Oreg.

[21] Appl. No.: 442,948

[22] Filed: Nov. 19, 1982

[51] Int. Cl.$^4$ .................. G06F 15/20; G01R 31/28
[52] U.S. Cl. ........................... 364/481; 324/73 R; 364/487; 371/20; 371/25
[58] Field of Search ............... 364/550, 551, 900, 480, 364/481, 484, 486, 487; 371/20, 25, 23; 324/73 R, 73 AT, 73 PC

[56] References Cited

U.S. PATENT DOCUMENTS

| | | | |
|---|---|---|---|
| 3,243,779 | 3/1966 | Shillington | 364/900 |
| 3,764,995 | 10/1973 | Helf, Jr. et al. | 324/73 R X |
| 4,055,801 | 10/1977 | Pike et al. | 371/25 X |
| 4,125,763 | 11/1978 | Drabing et al. | 371/20 |
| 4,258,421 | 3/1981 | Juhasz et al. | 364/424 |
| 4,303,991 | 12/1981 | Moore | 364/900 |
| 4,434,488 | 2/1984 | Palmquist et al. | 324/73 R X |
| 4,450,560 | 5/1984 | Conner | 371/25 |
| 4,471,348 | 9/1984 | London et al. | 364/551 |
| 4,497,056 | 1/1985 | Sugamori | 324/73 R X |

OTHER PUBLICATIONS

"Simplifying Microcomputer-Based Product Design" by Archer; published by Tektronix Inc.; Jan. 1981: pp. 3-0 to 4-13.

Primary Examiner—Errol A. Krass
Assistant Examiner—Edward R. Cosimano
Attorney, Agent, or Firm—John H. Bouchard; George T. Noe

[57] ABSTRACT

An apparatus for time aligning data acquired by one test instrument with corresponding data acquired by another test instrument is disclosed. A set of binary codes, representative of a set of instructions executed by a microprocessor disposed within a user's prototype circuit, are acquired by said one test instrument. With the acquisition of each of said binary codes, a count is developed in a counter indicative of each said acquisition. A multitude of binary data is acquired, independently of the acquisition of the set of binary codes, by said another test instrument, the multitude of binary data being representative of the functions performed by a set of components present within said user's prototype circuit. The binary codes acquired by said one test instrument and the binary data acquired by said another test instrument each have associated therewith a count developed from said counter. A mini-computer receives the binary codes acquired by said one test instrument, the binary data acquired by said another test instrument, and the counts corresponding thereto. The mini-computer time-aligns the binary data acquired by said another test instrument with the binary codes acquired by said one test instrument, using the counts associated therewith. A display of the time-aligned data is developed on a display device. As a result, when an instruction is executed by the microprocessor of the user's prototype circuit, using said display, it is possible to easily analyze the activity which took place among the components present within the user's prototype circuit as a result of the execution of said instruction by said microprocessor.

10 Claims, 5 Drawing Figures

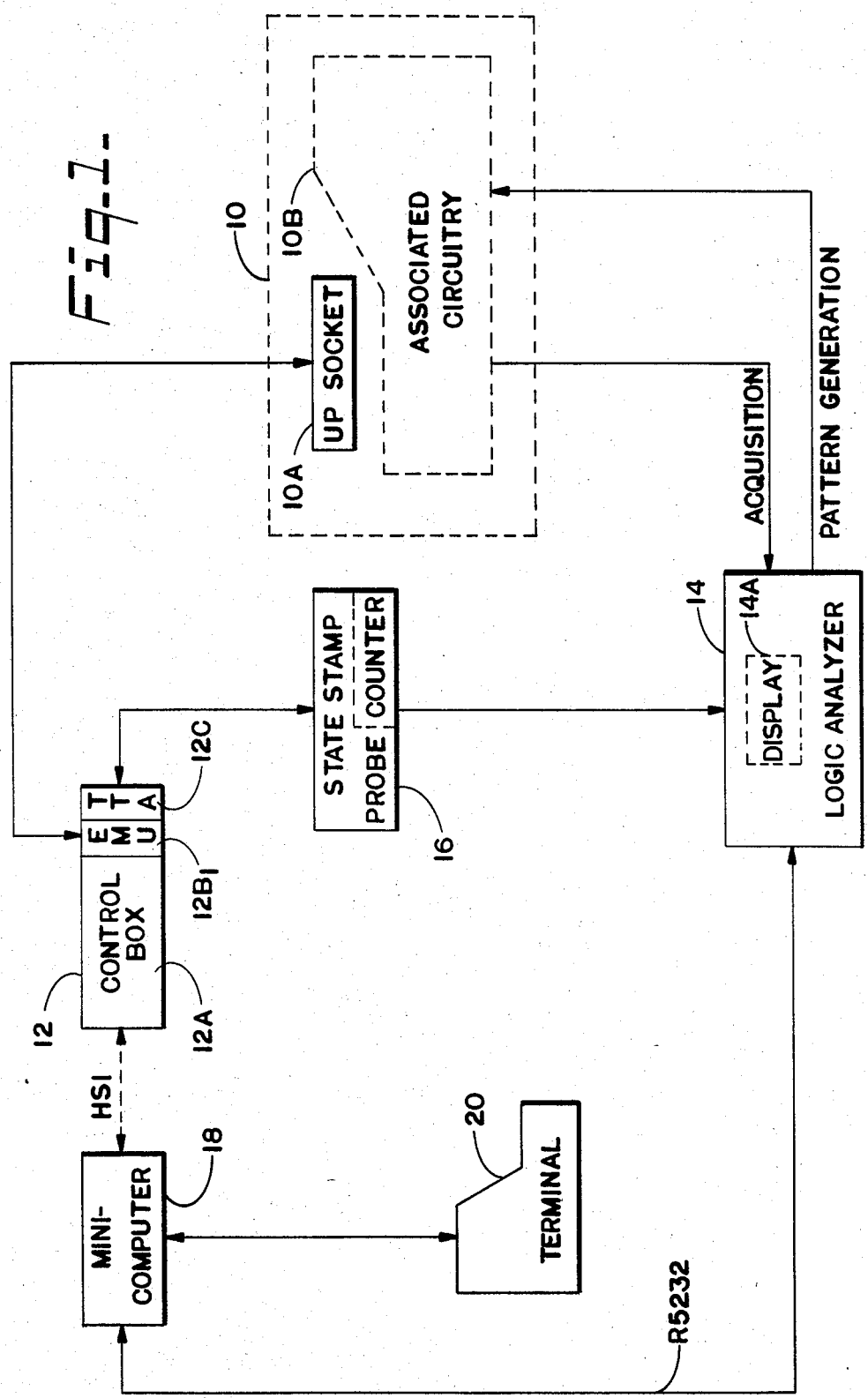

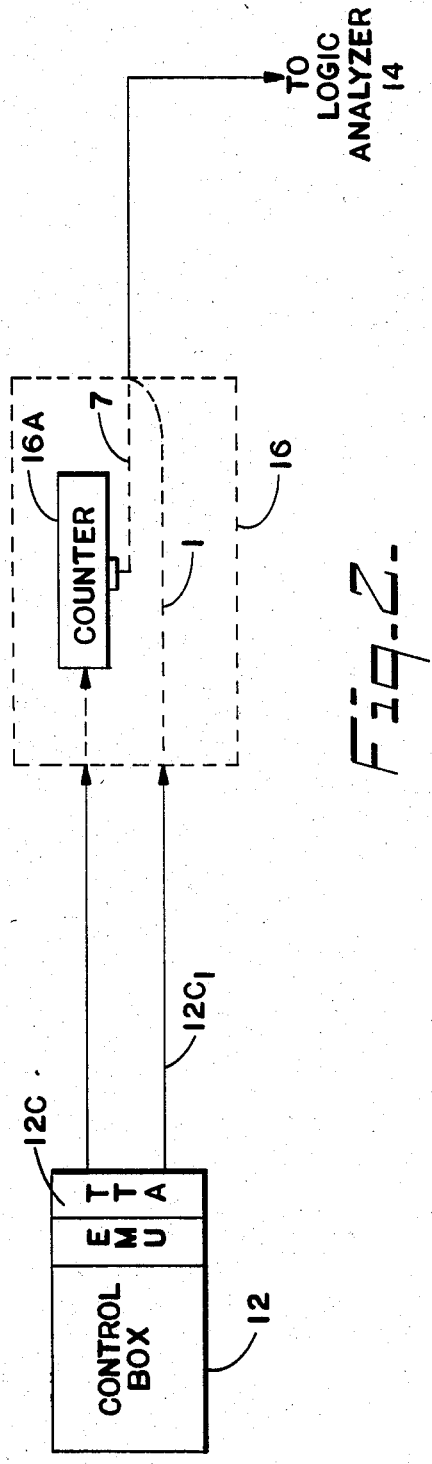

| ACQ | ADDR | DATA | MNEMONIC | 7-PROBE-0 | | BUS |
|-----|------|------|----------|-----------|---|-----|
| SEQ | | A | | B | C | |
| | | HEX | | OCTAL | ASCII | |
| 1 | 0100 | 21 | LXI  H | 0000 0000 | | M R F |
| 8 | | 22FE17 | | 35 | A | |
| 9 | | 22FFC7 | | 17 | A | |
| 2 | 0101 | 00 | | 0000 0000 | | M R |
| 10 | | 23FFC7 | | 17 | B | |
| 11 | | LOOP | | 16 | C | |
| 3 | 0102 | 05 | | 0000 0000 | | M R |
| 12 | | 33FFC7 | START | | D | |
| | | 2355C7 | | 26 | A | |

Fig. 4.

METHOD AND APPARATUS FOR TIME-ALIGNING DATA

BACKGROUND OF THE INVENTION

1. Field of the Invention

The subject matter of the present invention pertains to a method and apparatus for time aligning data acquired by one test instrument with corresponding data acquired by another test instrument.

2. Description of the Prior Art

In a prototype microprocessor-controlled circuit, the microprocessor included therein executes a set of instructions stored in a memory. As a result of the execution of each instruction by the microprocessor, various functions are performed by the other components present in the circuit. Often, a test instrument, such as an emulator, is used, in lieu of said microprocessor, in the prototype circuit to emulate the function of said microprocessor. The emulator contains a memory for storing a set of binary codes therein representing the set of instructions executed by the microprocessor. In addition, another test instrument, such as a logic analyzer, is used to monitor the functions performed by said other components present in said circuit, and to display a multitude of binary data indicative of said functions.

However, there is no apparatus currently known capable of acquiring the set of binary codes, representative of the set of instructions executed by the microprocessor, and the multitude of binary data indicative of said functions, and capable of inter-relating and time-aligning, in chronological order, the set of binary codes with the multitude of binary data for analysis and interpretation thereof.

SUMMARY OF THE INVENTION

It is therefore a primary object of the present invention to provide an apparatus capable of time-aligning data acquired by one test instrument with data acquired by another test instrument.

It is another object of the present invention to display on one display means the time-aligned data acquired by the respective test instruments.

These and other objects of the present invention are accomplished by acquiring the set of binary codes representative of the set of instructions executed by the microprocessor of the prototype circuit. With the acquisition of each of said binary codes, a count is developed in a counter indicative of each said acquisition. The multitude of binary data is acquired independently of the acquisition of the set of binary codes. The set of binary codes and the multitude of binary data each have associated therewith a count representative of a count of said counter.

A mini-computer receives the acquired set of binary codes and the acquired multitude of binary data including the counts corresponding thereto. A count corresponding to a binary code is associated with the same count corresponding to a group of binary data. When this association is made, the group of binary data, indicative of the functions performed by said other components present in said circuit, is matched, or time-aligned, on a display, with the binary code, indicative of the execution of the corresponding instruction by said microprocessor. As a result, when an instruction is executed by the microprocessor of a user's prototype circuit, it is possible to easily determine and analyze, on said display, the activity which took place among said other components present in said circuit as a result of the execution of said instruction by said microprocessor.

Further scope of applicability of the present invention will become apparent from the detailed description given hereinafter. However, it should be understood that the details of the description and the specific examples, while indicating preferred embodiments of the invention, are given by way of illustration only, since various changes and modifications with the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIG. 1 illustrates an apparatus according to one embodiment of the present invention for time aligning data acquired by one test instrument with corresponding data acquired by another test instrument.

FIG. 2 illustrates the construction of a state stamp probe, one component of the apparatus illustrated in FIG. 1.

FIGS. 3A–3B illustrate, in concept, the manner in which the results of the present invention are achieved.

FIG. 4 illustrates a resultant display associated with the apparatus of the present invention.

DETAILED DESCRIPTION OF THE PREFERRED EMBODIMENTS

The full appreciation and understanding of the present invention will be obtained with reference to FIG. 1 of the drawings. In FIG. 1, an apparatus for time-aligning data acquired by one test instrument with corresponding data acquired by another test instrument is illustrated. A user's prototype microprocessor controlled circuit 10 would normally utilize a microprocessor 10A and a set of associated circuitry 10B for performing certain functions as directed by the microprocessor 10A.

In lieu of the microprocessor 10A in the phototype circuit 10, an emulator 12 may be utilized for emulating the functions of the microprocessor 10A. The emulator 12 includes a probe adapted to be inserted within a socket wherein the microprocessor 10A resides within the prototype circuit 10. A typical emulator, which may be utilized to perform the function of the emulator 12 illustrated in FIG. 1, is the Tektronix 8540 Advanced Integration Unit. The emulator 12 includes a control box 12A, an emulator portion 12B, and a trigger trace analyzer 12C.

A plurality of probes, connected to a logic analyzer 14, are attached to the components disposed within the associated circuitry 10B of the user's prototype circuit 10, the logic analyzer being utilized as a monitor for monitoring the functions performed by said components disposed within the associated circuitry 10B. The logic analyzer 14 acquires a multitude of binary data indicative of the functions performed by said components within the associated circuitry, and displays the multitude of binary data on a display 14A. A typical logic analyzer which may utilized to perform the function of the logic analyzer 14 illustrated in FIG. 1 is the Tektronix DAS-9100 series logic analyzer.

One output of the trigger trace analyzer 12C associated with the emulator 12 is connected to an input of a state stamp probe 16. An output terminal of the state stamp probe 16 is further connected to an input of the logic analyzer 14. Referring to FIG. 2, the state stamp probe 16 further includes a counter 16A the input of which is connected to the trigger trace analyzer 12C at the output terminal thereof. The output of counter 16A is connected to the input of the logic analyzer 14. A further output terminal of the trigger trace analyzer 12C is connected to the output terminal of the counter 16A. An output signal from the counter 16A comprises a seven bit binary signal. An output signal from the further output terminal of the trigger trace analyzer comprises a one bit binary signal. As a result, an output signal generated by the state stamp probe 16 comprises seven bits, representing the output signal from counter 16A, followed by an eighth bit, representing the output signal from the further output terminal of the trigger trace analyzer 12C.

Referring to FIG. 1, an output terminal of the emulator 12, and an output terminal of the logic analyzer 14 are both connected to a mini-computer 18. A typical mini-computer which may be used to perform the function of the mini-computer 18 illustrated in FIG. 1 is the Tektronix 8560 Multi-User Software Development Unit. The mini-computer 18 time-aligns a set of binary codes received from the emulator 12 with the multitude of binary data received from the logic analyzer 14, and displays the time aligned data on a display terminal 20 connected thereto.

In order to fully appreciate the function performed by the apparatus shown in FIG. 1, reference is directed to FIG. 3A of the drawings. In FIG. 3A, an example is given of the binary codes acquired by emulator 12 in one column, versus binary data acquired by logic analyzer 14 in a second column. The binary codes comprise a code "DATA Ø" and a code "DATA 4". Associated with the code "DATA Ø" is a count indicated by "count 1". Associated with the code "DATA 4" is a count indicated by "count 2". The binary data acquired by the logic analyzer 14 comprises data indicated by "DATA 1", "DATA 2", "DATA 3", and "DATA 5". Associated with this data are counts indicated by "count 1", "count 1", "count 1", and "count 2", respectively. The present invention time aligns the binary codes acquired by emulator 12 with the binary data acquired by logic analyzer 14, by using the counts associated therewith. When the time alignment process is complete, a display similar to the illustration shown in FIG. 3B of the drawings is presented on the display of display terminal 20. Referring to FIG. 3B, utilizing said counts, and specifically COUNT 1, the binary data indicated by "DATA 1", "DATA 2", and "DATA 3" are aligned, in chronological order, with the code indicated by "DATA Ø". Similarly, utilizing count 2, the binary data indicated by "DATA 5" is aligned in chronological order, with the binary code indicated by "DATA 4". An example illustration of a display presented on the display terminal 20 is presented in FIG. 4 of the drawings. Note that FIG. 4 is similar to FIG. 3 in format.

A description of the functional operation of the present invention, illustrated in FIGS. 1 and 2 of the drawings, producing the results shown in FIGS. 3B and 4 of the drawings, is presented in the paragraphs provided hereinbelow.

The microprocessor 10A associated with the user's prototype circuit 10 is removed, and a probe associated with emulator 12 is plugged therein. A probe associated with logic analyzer 14 is connected to the components included within the associated circuitry 10B within the user's prototype circuit 10. The emulator 12 begins to execute a set of instructions stored therein similar to the instructions executed by the microprocessor 10A associated with the user's prototype circuit 10. When each instruction is executed by the emulator portion 12B associated with emulator 12, a binary code is acquired thereby and is stored in a memory therein. Simultaneously therewith, the trigger trace analyzer 12C associated with the emulator 12 produces a pulse at an output terminal thereof for incrementing the counter 16A associated with the state stamp probe 16. The counter 16A develops an output signal indicative of the count recorded therein. Consequently, when the logic analyzer 14 acquires binary data from the components included within the associated circuitry 10B within the user's prototype circuit 10, the binary data is associated with a count of the counter 16A, the binary data and the count corresponding thereto being stored within the logic analyzer 14. When the instruction has been completely executed by the emulator 12, a trigger pulse is generated at the further output terminal (12C1) of the trigger trace analyzer 12C. This trigger pulse is received by the logic analyzer 14 and prevents the logic analyzer 14 from acquiring further binary data from the components included within the associated circuitry 10B of the user's prototype circuit 10.

A further instruction is executed by the emulator 12, and another binary code is acquired thereby for storage therein. Simultaneously therewith, another output pulse is generated by the trigger trace analyzer 12C at the output terminal thereof for incrementing, again, the counter 16A. The counter 16A then generates another output signal indicative of the incremented count, said another output signal being received by the logic analyzer 14. Consequently, when the logic analyzer 14 begins to re-acquire binary data from the components included within the associated circuitry 10B, the incremented count is associated with the re-acquired binary data. The re-acquired binary data and the incremented count associated therewith are stored within the logic analyzer 14. When the further instruction has been fully executed by the emulator 12, a trigger pulse is again generated by the trigger trace analyzer 12C at the further output terminal thereof, in order to prevent to logic analyzer 14 from continuing to acquire further binary data from the components included within the associated circuitry 10B.

When the set of binary codes and the counts corresponding thereto are fully acquired by emulator 12 and stored therein, and when the multitude of binary data and the counts corresponding thereto are fully acquired by the logic analyzer 14 and stored therein, the set of binary codes, the multitude of binary data, and the counts corresponding respectively thereto are transmitted to and received by the mini-computer 18. In accordance with a software program stored therein, the mini-computer 18 time-aligns, in chronological order, the binary data acquired by logic analyzer 14 with the binary codes acquired by emulator 12, using the counts corresponding respectively thereto. For example, referring to FIG. 3A, the mini-computer 18, using the counts corresponding respectively thereto, time-aligns "DATA 5", associated with the binary data acquired by logic analyzer 14, with the "DATA 4" associated with the binary codes acquired by emulator 12. Further, the mini-computer 18 time-aligns "DATA 1", "DATA 2", and "DATA 3", associated with the binary data acquired by logic analyzer 14, with "DATA ∅", associated with the binary codes acquired by emulator 12. As a result of this time alignment process, the mini-computer 18 generates an output signal which is received by terminal 20, the terminal 20 generating a display thereon having a format similar to the format illustrated in FIG. 3B of the drawings. Note that "DATA 1", "DATA 2", and "DATA 3" are time-aligned, in chronological order with "DATA ∅", and "DATA 5" is time-aligned with "DATA 4". Terminal 20 will present a display thereon very similar to the display illustration shown in FIG. 4 of the drawings.

A complete description, in algorithmic form, of the software utilized by mini-computer 18 for performing the time alignment function of the present invention is set forth under the heading "3.2.4 Time-Correlation/Display Functions" and subheadings 3.2.4.1 and 3.2.4.2 in a document entitled "Digital Design Lab (DDL) Functional Requirement Specification". An abridged version of this document is duplicated hereinbelow in Appendix A. Relevant illustrations referred to therein correspond to the drawings wherein FIG. 1 corresponds to FIG. 1 and FIGS. 2, 4A, and 5 correspond to FIG. 4. The "DAS" referred to corresponds to logic analyzer 14 in FIG. 1, "8540" corresponds to emulator 12, and "8560" corresponds to minicomputer 18.

APPENDIX A

2 DDL Overview

2.1 Purpose of DDL

The DDL system will provide two primary capabilities to the user. First, it will permit the DAS and 8560 to communicate. This communication will make it possible to exchange data between DAS and 8560 and transfer commands from 8560 to the DAS. This is especially attractive because the 8560 box contains a mass storage device (hard disk) on which DAS data/initialization/control files may be stored. Also, the 8560, being a UNIX-based software development unit, will be able to process acquisition data files received from the DAS.

The second major objective of DDL is to merge 8540 emulation/TTA functions and DAS logic analysis/pattern generation functions during prototype debugging operations. Currently, emulation provides visibility into the operations of a prototype in the sense that detailed operations within the prototype processor may be monitored and controlled (see FIG. 1). However, using an emulator only, little knowledge is gained regarding operations in areas of the prototype which are electrically isolated from the microprocessor ("associated circuitry" in FIG. 1) or which occur between processor bus cycles. Information regarding these operations may be obtained via a logic analyzer such as the DAS.

One problem associated with monitoring/controlling a prototype with both an emulator/TTA and logic analyzer is that the information derived from the emulator/TTA and logic analyzer is typically not correlated in time. That is, it is often unclear which events shown on the logic analyzer display correspond to given events shown on the emulator control console. The DDL system will solve this problem by providing one of the two systems (the DAS) with a time reference which will be read during each of its data acquisitions. This time reference will subsequently be used by time-correlation software.

After EMU/TTA and logic analyzer data acquisition operations are completed, the data acquired by each system will be uploaded to the 8560 where the data will be time-correlated and subsequently displayed on a terminal.

The first DDL objective, providing communication between the DAS and 8560, may be accomplished via an 8560-resident software package and an RS-232 cable which would connect the DAS and 8560. The time correlation function may be accomplished via the software package and RS-232 cable mentioned above plus a special DAS "State Stamp Probe".

2.2 System Configuration

DDL is the hardware and software interconnection of an 8560/8540 system and a DAS. A typical system configuration, shown in FIG. 1, consists of an 8540 (which contains an emulator and TTA), 8560, DAS, State Stamp Probe, RS-232 cable, and terminal (typically, the CT8500). The pieces of hardware which comprise the DDL product, itself, are the "State Stamp Probe" which functionally provides a common time reference for the DAS/TTA combination and the RS-232 cable which provides an electrical path for communication between the DAS and 8560. Software required for DDL operations will reside primarily in the 8560. The software will provide communications/control capability between DAS and 8560, perform the time correlation of DAS/TTA data, and generate the appropriate displays.

The items to be productized as "DDL" are therefore: the State Stamp Probe, RS-232 cable, and DDL software (8560-resident software, written in "C").

2.3 Configuration Limitations

System/device configuration limitations for DDL include the following:

Initially, ONLY the 91A08 and 91A32 DAS acquisition cards (cards currently marketed) will be supported. The 91A04 card currently under development acquires four bits of data only and is therefore not compatible with the 8-bit State Stamp Probe. The feasibility of supporting other DAS cards will be investigated as those new cards approach PSR.

Time-correlation operations will not be supported if DAS is operated in ARMS or AND mode.

2 4 Functional Overview

DDL will typically be used in the debugging of single or multi-processor prototypes in which one processor is to be emulated and other non-synchronous activity on the prototype is to be monitored. The "other non-synchronous activity" could be occurring at another processor on the board or at any point of interest.

To use DDL, the user connects and configures the emulator as desired, connects the DAS probe lines to the points of interest, sets up the TTA and DAS subject to the restrictions imposed by DDL and then enters the "dstart" command on the 8560 terminal. When a breakpoint event is detected by the TTA, the emulator is halted and the TTA sends a trigger signal to the DAS which stops DAS acquisitions. The user then enters the "duplod" command to upload DAS and TTA data to the 8560. After the uploading process is finished, the user enters the "ddisp" command. This causes time-correlated DAS and TTA data to be shown on the 8560 terminal.

As shown in the sample DAS/TTA display in FIG. 2, DAS acquisition data will be interspersed with TTA data in such a way that the DAS and TTA data will be presented in chronological order. For example, in the sample display, TTA acquisition 1 was followed in time by DAS acquisition 8 (this number, 8, is referred to as a "DAS Sequence Number"). DAS acquisition events on the terminal labeled with a given sequence number correspond to those labeled with the same sequence number on the DAS screen. After identifying an item of interest on the terminal and noting the item's sequence number, the user can therefore move the DAS cursor to the corresponding point of interest on the DAS display. The scrolling of the cursor can be performed either via the DAS keyboard or the 8560 terminal (using the "tcur", "scur" or "scroll" commands).

Since the DAS acquisition files are uploaded to the 8560, the acquisition files may be processed by UNIX tools (eg: grep), TEK-supplied tools (eg: showacq command) or, if the user's 8560 has the "Native Programming Language" software package, by user-developed tools.

3 Detailed Requirements

DDL will perform the functions and have the characteristics specified in this section. These requirements are divided into two categories: DDL hardware and DDL software.

3.1 Hardware Requirements

The primary items of hardware required for DDL are the State Stamp Probe and RS-232 cable.

3 1.1 State Stamp Probe

The State Stamp Probe is a device which interconnects the TTA and the DAS, and is very similar in appearance to a typical P6452 DAS probe. At one end of the probe are three BNC connectors. One BNC is connected to the "Trigger 4" output of the TTA Acquisition panel. Another is connected to "Qualifier In" on the Acquisition Panel, and the third is connected to an "appropriate" Trigger Output on the panel. The "appropriate" connector is the one whose corresponding Event Recognizer on the TTA has been programmed by the user to output a trigger pulse when a breakpoint event occurs on the TTA The other end of the probe connects to the DAS in the same manner as a standard acquisition probe and may be connected to either a 91A32 or 91A08 card whose inputs are located on the back of the DAS.

The probe provides 8 bits of information to the DAS, seven bits of which contain the output of a grey code counter housed within the probe. The count is incremented by a pulse emitted by the TTA each time the TTA performs a data acquisition. The counter data is read by the DAS each time the DAS acquires data and is later used by the DDL software in the 8560 to perform time correlation of the 8540 and DAS data.

The remaining bit, bit 7, is used to trigger the DAS. Triggering is accomplished via the BNC which is connected to the "appropriate" trigger output as noted above. When a breakpoint event occurs on the TTA, if the TTA events are properly programmed, a pulse is emitted from that "appropriate" trigger output. This pulse is stretched to about 1 second in length by the probe and is then forwarded to the DAS. If configured correctly by the user (ie: set to trigger on a 1XXXXXXX read from the State Stamp Probe), the DAS will trigger when a "1" is read on bit 7 (MSB).

Hardware in the probe will permit probes to be cascaded, that is connected in parallel in such a way as to increase the range of the grey code count in increments of 128 (7 bits). It is not anticipated that the cascading feature will be utilized in the near future; however, since the feature was added at little cost, presents minimal risk and could be useful in the future, it was included in the probe. Currently, DDL software will not support the cascaded probe configuration.

3.1.2 Interconnect Cable

The other primary item of hardware in the DDL product package is an RS-232 cable. This cable connects any properly-configured 8560 IOP port to the DAS RS-232 port and provides the electrical path over which DAS acquisition data, DAS setup packets and DAS keystroke/control commands are exchanged between the DAS and 8560.

3.2 Software Requirements

The DDL project is a software-intensive undertaking and consequently, most of the system requirements are software related. This section outlines those software requirements.

3.2.1 Overview

As was described previously, DDL is a system which merges a logic analyzer/pattern generation unit (the DAS) with a microcomputer development system (the 8560/8540). Three individual mainframes make up the typical DDL system configuration: the 8560, DAS and finaly the 8540 which houses the emulator and TTA. DDL software resides in the 8560, the "central" unit in the configuration which communicates with both the DAS and 8540.

DDL software is written in the language "C". Although the bulk of the software is newly-developed, certain subroutines were taken from previous DAS/8560 communications package developed by the LA Business Unit as part of an Applications Note.

The software functions fall into five categories: DAS/8560 Communication, DDL system control (start/stop/upload, etc.), time-correlation/display, miscellaneous tools and guide/menu software. These categories are described in the paragraphs which follow.

3.2.2 DAS/8560 Communication

DDL software will provide a means for the exchange of data and commands between the DAS and 8560. Examples of communication between the two units are:
 Transfer of acquisition data from DAS to 8560
 Transfer of DAS setup packets from DAS to 8560 or vice versa
 Transfer of DAS card configuration information from DAS to 8560
 Transfer of keystroke commands from 8560 to DAS
 Transfer of arbitrary ASCII strings from 8560 to DAS Descriptions of the user commands which initiate these functions are given below.

getpac Command

This command will transfer a DAS setup packet such as ALL, PATGEN, REFMEM, ACQSETUP, or MNEMONICS from the DAS to an 8560 file.

Command syntax:
getpac {packet type}{8560 filename}
  packet type=all, patgen, refmen, acqsetup or mnemonics
  8560 file=File on the 8560 to receive the packet
example:
getpack all my all
Reads the current DAS all packet and places it in file "my all"

putpac Command

This command will transfer a DAS setup packet from an 8560 file to the DAS.
Command syntax:
putpac {packet type}{8560 file}
  packet type=all, patgen, refmem, acqsetup or mnemonics
  8560 file=File on the 8560 disk containing the packet
example:
putpac all my all
Transfers the current DAS all packet from 8560 file "my all" to the DAS.

getacq Command

The "getacq" command reads one of the four acquisition memories from a DAS 91A32 card or reads acquisition or "glitch" memory from a DAS 91A08 card and places the data in an 8560 file.

If no file name is specified a default file name of the form "DASaq (card type) (slot) (pod)" is assigned. For instance, the default name for a file containing acquisition data for pod B of a 91A32 card plugged into slot 5 would be "DASaq 32 5B".

Command syntax
getacq {slot}{pod}[filename]

| Examples: | |
|---|---|
| for 91A32 cards | |
| getacq 2 poda | (read acq memory from pod A of card in slot 2 and place in file having default name DASaq. 32.2A) |
| getacq 2 podc my file | (read acq memory from pod C of card in slot 2 and place in file "my file") |
| for 91A08 cards | |
| getacq 3 glitch | (read glitch memory from the 91A08 card in slot 3; place data in file DASaq 08 3GLIT |
| getacq 3 reg | (read regular acquisition memory from 91A08 card in slot 3, place data in DASaq 08.3R | showcon Command

"showcon" displays on the 8560 terminal the current DAS card configuration.
Command syntax:
showcon senddas Command

The senddas command permits a user to send an arbitrary ASCII command string to the DAS. Permissible command strings are given in the GPIB section of the DAS 9100 Series Operators Manual.
syntax:
  senddas "string"
example:
  senddas "TRIGGER; HOME"
This sends the TRIGGER command followed by the HOME command to the DAS.

scroll Command

When the user invokes the scroll command, the DAS calls up the Timing Diagram display (if not already displayed) and moves the cursor a specified number of positions.

Depending on the magnification (resolution) setting on the DAS, each "position shift" specified by the user may be a shift of more than one sequence number. For example, each position shift of the cursor when the DAS magnification setting is 1 will move the cursor approximately 5 numbers higher in sequence number. If the magnification setting is higher, for example 10, a shift of 1 will result in a cursor shift one higher in sequence number.

The number of shifts specified must be in the range −99 through +99.

syntax:
  scroll [+] {number of shifts}
         {−} example:
  scroll 5 (Shifts cursor to right 5 times)
  scroll −3 (Shifts cursor to the left 3 times)

tcur Command

The "tcur" command causes the DAS to display its timing diagram with the cursor placed at a specified sequence number.
Legal sequence number are 0 through 511.
syntax:
  tcur {sequence number}
example:
  tcur 443 scur Command

The "scur" command causes the DAS to display its state table display with the cursor placed at a specified sequence number.
Legal sequence numbers are 0 through 511.
syntax:
  scur {sequence number}
example:
  scur 443

3.2.3 DDL System Control Functions

System control functions for DDL are performed primarily by the "dstart" and "duplod" commands described below.

dstart Command

The "dstart" command creates certain control files, starts DAS acquisition operations and then starts the emulator. The starting address for emulator execution may be specified as a command parameter. If no starting address is given, execution starts from where it left off (PC next).
syntax:
  dstart [address]
examples:
  dstart 100: (Start the DDL system Emulator start at address 100)
  dstart: (Start DDL; emulator starts at PC next)
Other special forms of the "dstart" command will also be available. Those forms are:
  dstart −a [address]

dstart −p [address]

Normally, just the "dstart" command without modifiers would be used. The command without modifiers executes a START SYS on the DAS meaning that both DAS acquisition and DAS pattern generation operations are initiated. The "−a" option starts DDL operations but only initiates DAS acquisition operations (pattern generation is not started). The "−p" option starts the DAS pattern generator but does not start DAS acquisition operations. A consequence of using the "−p" option is that no time-correalation of DAS and TTA data is possible since the DAS does not acquire data in that mode of operation.

duplod Command

After the DDL system is started and subsequently halts due to the occurrence of the triggering event, the DAS data is uploaded to the 8560 via the "duplod" command. To be more specific, "duplod" creates certain files used by the time correlation algorithm, and uploads the DAS acquisition information to 8560 files. (TTA data is uploaded as part of the "ddisp" command function to be described later).

The files created during this process are placed in the current directory and are assigned the following names:

DASconfig—File containing the DAS card configuration information

TTAtrig—File containing TTA state information at the completion of data acquisition operations.

DASaq. (type). (slot) (pod)—File containing DAS acquisition memory data for card of the indicated type in the indicated slot/pod For example: DASaq. 32.2A contains acquisition data for pod A of the 91A32 card plugged into slot 2.

The time required to upload this information is approximately 10 to 20 seconds depending on the number of acquisition cards plugged into the DAS. During upload operations, indications are given on the terminal as to what phases of the uploading operation have been completed. For example:

Verifying DAS has stopped . . .
Uploading current DAS card configuration . . .
Uploading slot 2, pod A acquisition data . . .
Uploading slot 2, pod B acquisition data . . .
Uploading slot 2, pod C acquisition data . . .
Uploading slot 2, pod D acquisition data . . . .

3.2.4 Time-Correlation/Display Functions

DDL software, resident in the 8560, will time-correlate the DAS and TTA data and display the data on the 8560 terminal. Details of the time correlation and display functions are given in this section.

3.2.4.1 Time-Correlation

As was previously mentioned, a major function of the TTA in DDL operations is that it monitors the emulator for a breakpoint state. (The TTA must be configured by the user to do this). If that state is detected, the TTA outputs a trigger pulse to the State Stamp Probe. The probe lengthens the pulse and sends it on to the DAS which, if configured properly, also triggers. That lengthened pulse is also sent back to the TTA and recorded in a segment of its acquisition memory. In order to describe the time correlation method, it is necessary to give an overview of what that acquisition memory segment contains and how it is used.

The TTA acquisition memory containing (an indication of) the stretched trigger pulse is a 256-byte block which may be read as system memory locations EB00-EBFF. Each memory location corresponds to one of the 256 acquisitions which may be stored by the TTA. As each TTA acquisition is prformed, one of the bytes in this control memory is loaded with an ID bit (bit O, the LSB) and a bit (bit 2) which reflects the state of the stretched pulse returned from the State Stamp Probe. When the end of this block of memory space is reached, access loops back around to the top of the block. Access by the user to this memory is only permitted after writing a 02 to control port 70 (ie: WRT *70 2); access is disabled by doing a WRT *70 0.

The purpose of the ID bit mentioned above is to indicate whether the corresponding item of TTA acquisition data is "new" data or "old" data. Since it is possible for the TTA to do fewer than 256 acquisition cycles during a given operation, the ID bit is used to tell where the old data (if any) stops and where the new data begins. For example, after the TTA starts, as TTA data is acquired, the ID bits will be loaded with an ID of 0 or 1; say 1 in this case. If data acquisition operations stop (a breakpoint occurs, etc.) and the user starts data acquisition operations again the ID written into each of the data base locations as acquisition operations proceed will be 0. Thus, by looking where the ID bit makes a transition in state, the boundary between old and new data may be found. DDL time-correlation software makes use of this bit.

After DDL operations cease and TTA and DAS data is uploaded to the 8560, DDL software in the 8560 will perform the time correlation and display functions. To accomplish the time correlation function, DDL software first identifies the acquisition events in the DAS and TTA data which occurred at the time of the trigger. The TTA trigger event may be determined by looking for the stretched trigger pulse in the special segment of TTA acquisition memory; the DAS trigger event is indicated in the DAS acquisition file header. Using these two trigger events as the starting point and working backwards, the DAS and TTA data is read.

Since the DAS data base contains the grey code count (which is incremented upon each TTA acquisition) one can work backwards from the trigger point in the DAS data and look for a transition in the grey code count. When this transition is detected, it may be inferred that this DAS data and all previous data until the next transition are associated with the trigger TTA event minus one. Similarly, still working backward in the DAS data, the next grey code transition is searched for. When the transition is found, the associated DAS data at that acquisition event and all previous data until the next grey code transition can be associated with the trigger TTA event minus 2. The process is repeated until the start of the DAS or TTA data files is reached. DAS (TTA) acquisitions remaining after all TTA (DAS) acquisitions have been read are considered to be "un-correlated" data.

It should be noted that in order to find the trigger event in TTA acquisition memory, DDL software makes use of a pointer found at system I/O port 75 (ie: a RD *75 is done). Port 75 contains a pointer into the TTA data base indicating the location of the last acquisition performed by the TTA. (The last acquisition could be a number of cycles after the trigger event.) Once this acquisition is identified, software looks backwards in the data for the stretched trigger pulse as indicated by a change in state of bit 2 as described above.

3.2.4.2 Display Functions

Two of the DDL user commands which have the greatest control over the output of time-correlated data on the 8560 terminal are the "ddisp" and "dformat" commands.

ddisp Command

Time-correlation and (2–3 seconds later) the display of the time-correlated data will occur when the user enters the "ddisp" (DDL display) command on the 8560 terminal. The display, a sample of which is shown in FIG. 4, will consist of DAS data interspersed between lines of TTA data. DAS and TTA events will be displayed in the order in which they occurred in time.
Syntax:
 ddisp [−t][−d][−f first][−l last][−u]
  first=first TTA acquisition to be shown. Displays will start with this TTA acquisition event. Permissible values: 1–256. Default=1
  last=last TTA acquisition to be shown. Displays will end with this TTA acquisition event. Permissible values: 1–256. Default=256
  −u=show uncorrelated data. Normally only the sections of DAS and TTA data which overlap in time are shown. This modifier causes uncorrelated data to be shown also.
  −d=show DAS data only. Don't interleave TTA data
  −t=show TTA data only. Don't interleave DAS data At user option, all items shown in FIG. 4 need not be displayed and/or need not be displayed in the formats illustrated. Items to be displayed will be user-selectable via the "dformat" command to be described in a subsequent section of this SFRS.

The primary features of the display will be:
 An acquisition number which is simply a number associated with each sampling event of the TTA
 The TTA information itself which has the exact format of the TTA data displayed via the "disp" command
 Lines of DAS acquisition data which correspond to the data uploaded from DAS to 8560
 A sequence number (assigned by the DAS) which is associated with each acquisition of the DAS.

Display of the above-mentioned sequence number makes it possible for the user viewing the DDL data on the terminal to scroll the DAS display to the point corresponding to a particular line on the 8560 terminal. This is made possible by the fact that the DAS displays a cursor whose position is specified in terms of the DAS sequence number.

It should be noted that although a good deal of time-correlated data will be displayed on a single screen (8560 terminal), if a user wishes to take advantage of the full DAS display capabilities (timing diagrams, etc.) he/she will have to view the DAS display. As mentioned above, the sequence number on the 8560 terminal makes it possible for the user to scroll the DAS display to the point of interest. Scrolling may be done via the DAS keyboard or via the "tcur", "scur", or "scroll" commands.

When the "ddisp" command is entered, DDL software will check to see if TTA data from the last DDL operation had been previously uploaded (by a prior "ddisp"). If the data had NOT been uploaded a "disp" command transparent to the user will be done. This "disp" (not to be confused with "ddisp") command will cause the TTA data to be uploaded to 8560 file "TTAdata". At the same time, this data will be input to the "ddisp" command so that time correlation and display may be performed as the data is read. If the "ddisp" command finds that file TTAdata already exists (ie. a prior "ddisp" command had been performed), the command will merely read the data already existing in the file thereby making another TTA data upload unnecessary. Note that execution of a "start" command automatically removes the TTAdata file.

dformat Command

As mentioned above, all of the items described need not always be displayed nor do they have to be displayed in the format shown in the above sample. By using the "dformat" command, the user can specify display formats and options for all displays of DAS/TTA information. Those options will be used for all subsequent DAS/TTA displays until overridden via a subsequent "dformat" command.

The syntax of the dformat command is shown below. Note that the "verbose" option, to be described in subsequent paragraphs, will also be available to provide a simpler interface to an unsophisticated user.

```
dformat [−h yes ] [−p (slot)(pod)] [−t [mbpa]]
         no                        [all]
         [−d [a−l][m][hgoba](slot)(pod)(slot)(pod) . . . ]
```
modifier descriptions:
 −h Header display switch. Yes means display the default header, no means do not display the header. The header is the column identifier for the display, (eg. the line: "ACQ . . ADDR . . DATA . . MNEMONIC . . etc.)
  Default: −h yes
 −p Specifies the pod/slot into which the State Stamp Probe is plugged.
  Default: −p 2a
 −t Items to be shown on the TTA lines.
  all = show all TTA info possible
  m = show mnemonics field if applicable
  b = show "BUS" field
  p = show "PROBE" field
  Default: all
  Note: address and data fields are ALWAYS shown. The MNEMONICS, BUS and PROBE fields are the optional items.
 −d Items to be shown in DAS line and their format.
  [a–l] Different pods may be grouped together for display. Groups may be named "a" thru "l"
  [m]Substitute mnemonic if appropriate
  [hgoba] Display format to be used for this group:
  h = hex, g = grey code decoded to decimal ???
  o = octal, b = binary. a = ASCII
  (slot)(pod)(slot)(pod) . . The slot/pods to be in this group
  Default:
  no mnemonics, hex, 1 slot/pod per group assigned automatically per DAS card configuration Examples:
 dformat −h   no        (Turn off header display)
 dformat −p   3C        (State Stamp Probe is connected to slot 3, pod C)
 dformat −t   b         (Limit TTA line to address, data and bus fields, no PROBE or MNEMONIC fields)
 dformat −d   amh2a2b   bo2d
  Interpretation:
   DAS line should be grouped as follows- -continued

```
group A show mnemonics, show in hex,
include pods 2a and 2b
group B no mnemonics, show in octal,
include pod 2d
dformat −h yes −p 4c −t all −d amh2a2b2c bmo2d ca3a
Interpretation:
Header shoud be displayed
State Stamp Probe is plugged into slot 4C
Display all fields of TTA information
For DAS data:
Group A has 3 slot/pods in it, 2A,2B,2C.
The data will be shown in hex, except
if a mnemonic match is found, the
mnemonic will be substituted for the
hex data.
Group B has 1 slot/pod in it, 2D.
Data will be shown in octal except
if a mnemonic match is found, the
mnemonic will be substituted for the
octal data.
Group C has 1 slot/pod in it, 3A.
Data will be shown in ASCII format;
no mnemonic substitution will be done.
```

The resulting display is shown in FIG. 4.

—dformat verbose option—

To simplify the user interface to the "dformat" command, a "verbose" option may be used. This option will be invoked for an individual parameter in the command line if that parameter is immediately followed by a "v" and will cause the system to prompt the user for the desired format specifications. An example is given below. (User entries are shown surrounded by brackets <>).

```
<dformat −hv −pv −tv −dv>      (user wants verbose option
                                for all parameters)
header (y/n)? <y>              (System asks if the header should
                                be shown. User replies yes)
slot/pod receiving state stamp probe data (eg: 2a)? <3c>
(user has probe connected to slot 3 pod c)
items in TTA line:
include all items (y/n)? <n>   (user wants to specify items
                                separately)
mnemonics field (y/n)? <n>     (no TTA mnemonics)
bus field (y/n)? <y>           (include bus field)
probe field (y/n)? <y>         (include 7-bit probe field)
number of display groups? <3>  (user wants 3 display groups)
group a:
mnemonics (y/n)? <y>           (user wants mnemonics)
format (hex,oct,bine,asc)? <hex>  (user wants hex output)
specify slot/pods in group (eg: 2a,2b,3c): <2a,2b,2c>
(user specifies pods in group)
group b:
mnemonics (y/n)? <y>           (user wants mnemonics)
format (hex,oct,bin,asc)? <oct>   (user wants octal output)
specify slot/pods in group (eg: 2a,2b,3c): <2d>
(user specifies pods in group)
group c:
mnemonics (y/n)? <n>           (user doesn't want mnemonic)
format (hex,oct,bin,asc)? <asc>   (user wants ascii output)
specify slot/pods in group (eg: 2a,2b,3c): <3a>
(user specifies pods in group)
```

3.2.5 Miscellaneous Tools

Certain tools not previously described will be included in the DDL software package. These are discussed below.

3 2 5 1 Acquisition Data Processing Tools

Once the DAS acquisition files are read from the DAS and placed in 8560 files (via the "duplod" or "ge- tacq" commands), in addition to being displayed via the "ddisp" command, those files may be processed as the user sees fit. Processing may be performed via three types of tools:

UNIX tools such as grep

User-created tools. Assuming this is done in "C", the 8550 "Native Programming Language" package must be available to the user.

TEK-supplied software tools in the DDL product package

The numerous UNIX tools available are well-documented and will not be discussed here. User-created tools are limited only by the user's imagination. The third category, TEK-supplied tools currently includes one command, "showacq", described below showacq Command

This command reads a file containing DAS acquisition data and displays the data on the terminal. Since each DAS acquisition memory, and therefore each DAS acquisition file in the 8560, contains 512 events of 8-bit data acquisitions, displays will be byte-oriented. For flexibility, dash modifiers will permit the user to view the data in hex, octal or ASCII.

syntax:

showacq [-hoa]{file name} modifiers:

—h—Display acquisition data in hex

—o—Display acquisition data in octal

—a—Display acquisition data in ASCII

3.2.6 Mnemonics Definition Software

DDL display software will have the capability of substituting mnemonics and/or disassembled processor instructions for hex/octal/binary DAS data. The resulting display formats and the method for creating the symbol table are discussed below.

3.2.6.1 Display Format

The display format viewed on the DAS will depend on which optional features, if any, are included with the user's DAS. One factor which will influence the format of the 8560 DDL display is the presence of absence of the PM & PMA (7D02 Personality Module and Personality Module Adaptor). If the FM and PMA are NOT used, 8560 mnemonic display capability will be limited to simple substitution of an ASCII string for a particular hex state.

If the PM & PMA are present, however, it will be possible for the 8560 display to show disassembled instructions corresponding to data acquired by the DAS.

Disassembly is made possible in part by the PM which monitors address, data and control lines of the target processor, derives control signals (ie: fetch) and sends the data, address and derived control signal data to the DAS. After this data is uploaded to the 8560, disassembly algorithms in the 8560, in conjunction with a predefined symbol table, examine the DAS data and output the appropriate disassembly information to the 8560 screen.

The predefined symbol table will be a processor-unique table supplied to the user via floppy disk.

It should be noted that data acquired via the PM/PMA combination is time skewed by one or more DAS acquisition cycles relative to data NOT acquired via the PM/PMA. This means that target processor data in the nth position of DAS acquisition memory was not acquired at the same time as other data, notably the State Stamp data, in the nth position of DAS acquisition memory. The problem is compounded by the fact that if data qualification is performed on the data acquired via the PM/PMA, the time skew is variable. The consequence of this is that time correlation of DAS data and TTA data can not be done.

One system operating restriction which would eliminate this is requiring that the user NOT qualify data read via the PM/PMA if he/she wants to see time-correlated displays on the 8560 terminal. Such a restriction would assure that PM/PMA data and State Stamp data will be offset by one acquisition cycle. This known offset could be compensated for in DDL time-correlaton software.

Another solution to the problem which involves no operating restrictions is to route both the target processor data AND the time stamp data through the PMA. Such an approach would eliminate the time skew, permit data qualification to be used, and eliminate the need for DDL software to remove the time skew during PM/PMA operations.

It should be pointed out that the incorporation of the simple mnemonic substitution feature into DDL is a low-risk task. However, due to current uncertainties regarding the operation of the PM/PMA, the commitment to offering displays of disassembled processor instructions represents greater risk. The exact capabilities of DDL with regard to instruction disassembly are still to be determined.

3 2 6 2 Symbol Table Generation

Ideally, it would be nice to permit the user to enter mnemonics on either the DAS or 8560, exchange the mnemonics table between DAS and 8560 and view mnemonic displays on either the DAS or 8560 terminal. These capabilities will be investigated for possible incorporation into future phases of DDL. For phase 1, however, a subset of these functions will be implemented, namely the user will be permitted to enter mnemonics into the 8560 via the 8560 terminal and view the resulting mnemonic displays on the 8560 terminal only. (Of course, mnemonics could be seen on the DAS also if the user separately enters the mnemonics into the DAS via the DAS keyboard).

In Phase 1, mnemonics entered on the 8560 will not be transferable to the DAS nor will the 8560 be capable of uploading DAS mnemonics and using them in 8560 displays. (It will, of course, be possible to transfer DAS-created mnemonics packages between the DAS and 8560 disk for storage/retrieval). The point is that the 8560, in Phase 1, will not be able to extract and use information from DAS mnemonics packets nor will the DAS be able to generate displays using the mnemonics entered into the 8560.

To enter mnemonics into the 8560, the user will utilize the "mtable" command described below mtable Command

Creation of the mnemonics table will be performed by the "mtable" command which reads mnemonics from the standard input and builds and loads the table. A typical scenario for creating a mnemonics table would therefore be either:

| method 1 | (a) Create mnemonics file via any available editor. |
|---|---|
| or method 2 | (b) type "mtable <editor_output_file" |
| | (a) type "mtable" |
| | (b) type in mnemonics and associated values (format specified below) |
| | (c) terminate with a CNTL D |

The format of user-entered mnemonic data will be specified in a subsequent version of this document.

3.2.7 Menu-Driven Interfaces

Access to DDL software will be provided via two different user interfaces:
shell commands
menus Previous sections of this document presented DDL functions and how they might be entered via the shell. This section will discuss how many of these functions will be implemented via a menu-oriented interface called "guide".

Guide

One menu-oriented interface which permits a new or infrequent 8560 user to perform 8560 functions with minimal effort is "guide". When called by typing the command, "guide" this feature will present to the user a list of different categories of functions which may be performed by the 8560 system. Numbers are presented next to each category. The user then select a category by typing in the number associated with that desired category.

Once an item is selected, the 8560 prompts for any command parameters which may be required, executes the command and then re-displays the DDL Operations Menu. An example of a DDL operation via guide is given below.

Assume that the user wants to see the time-correlated DDL display and limit the display to TTA acquisitions 30–60. If the user were experienced he/she might enter the shell command directly which is:
  ddisp −f 30 −1 60

When using "guide" the user would enter the "guide" command, resulting in the display of the Guide Top-Level Menu. The user would then select option 7 (DDL Operations Menu) on the Top Level Menu thereby causing the DDL Operations Menu to be shown. Option (4) Display DDL Data) would then be selected. This would cause the prompt:
  Limit display to a range of lines? (y or n): <y>
to which the user would enter y as shown in brackets. Next, the prompts:
  First TTA line to be displayed: <30>
  Last TTA line to be displaye: <60>
To which the user responds 30 and 60 respectively as indicated in the brackets.

At this point, all prompting operations are completed and the equivalent "ddisp" instruction is issued to the system by guide.

As is the case for most guide operations, guide, when executing the command will show the user the command format which could be used for direct command entry to the shell. This command will appear on the screen preceded by a plus sign (+). In this case:
  +ddisp −f 30 −1 60

Appendix A-File Structures

This appendix describes the formats of various 8560 files created by DDL software.

A 1 DAS Acquisition File

When a DAS acquisition file is created on the 8560, it contains information from two separate 8560-DAS operations, a "TRIGPOS?" status interrogation and an "ACQMEM. .?" command. The file structure is as follows:

The DAS sequence number corresponding to the first byte of acquisition memory (derived from the DAS response to a "TRIGPOS"" command)

The DAS sequence number representing the DAS trigger event. This is also derived from "TRIGPOS?" except that the DAS sends an OFFSET value representing the offset from starting sequence number to trigger. This value is first converted to an absolute value corresponding to the trigger sequence number and is then placed in the DAS acquisition file.

See the DAS User Manual, GPIB section, for details.

Number of bytes of acquisition memory in the file
Bytes of acquisition data
The specific format is:

| Item Number | Data Type | Contents |
|---|---|---|
| 1 | int | DAS sequence number corresponding to first byte of acquisition data |
| 2 | int | DAS sequence number corresponding to trigger event |
| 3 | int | (=n) Number of bytes of acq memory to follow |
| 4 | char | First byte of acquisition memory |
| 5 | char | Second byte of aquisition memory |
| . | . | . |
| . | . | . |
| . | . | . |
| (n + 3) | char | Last byte of acquisition memory |

A-2 DASconfig File Structure

The file "DASconfig" contains information regarding the card configuration of the DAS, that is, describes which cards are plugged into which DAS slots.

The file structure is as follows:

| Item Number | Data Type | Contents |
|---|---|---|
| 1 | int | The value, 1 |
| 2 | int | Card ID in slot 1 |
| 3 | int | The value, 2 |
| 4 | int | Card ID in slot 2 |
| 5 | int | The value, 3 |
| 6 | int | Card ID in slot 3 |
| 7 | int | The value, 4 |
| 8 | int | Card ID in slot 4 |
| 9 | int | The value, 5 |
| 10 | int | Card ID in slot 5 |
| 11 | int | The value, 6 |
| 12 | int | Card ID in slot 6 |
| 13 | int | The value, 7 |
| 14 | int | Card ID in slot 7 |
| 15 | int | The value, 8 |
| 16 | int | Card ID in slot 8 |
| 17 | int | The value, 9 |
| 18 | int | Card ID in slot 9 |

A-3 TTAdata File Structure

File TTAdata will contain the redirected output from a TTA "disp" command. See the TTA User's Manual for the format of a "disp" display.

A-4 TTAstart File Structure

File TTAstart will contain the redirected output from a "RD *75" command executed immediately before the start of DDL acquisition operations. This file will therefore contain a pointer value which indicates the location in TTA acquisition memory where the first TTA acquisition will be placed.

This value is used by the time-correlation algorithm.

A-5 TTAtrig File Structure

File TTAtrig will contain the redirected output from a "rd *75" command executed during an "duplod" operation (ie: after acquisition operations cease). This file will therefore contain a pointer value which indicates the location in TTA acquisition memory where the last TTA acquisition was placed.

This value is used by the time-correlation algorithm.

The invention being thus described, it will be obvious that the same may be varied in many ways. Such variations are not to be regarded as a departure from the spirit and scope of the invention and all such modifications as could be obvious to one skilled in the art are intended to be included within the scope of the following claims.

What we claim as being novel is:

1. A method of time aligning in chronological order a second set of data with a corresponding separately-generated first set of data, comprising the steps of:
   acquiring by separate means said first set of data and said second set of data;
   producing a series of identifiers wherein an identifier is produced in response to each acquisition of said first set of data;
   associating each of said identifiers with said each acquisition of said first set of data and with acquisitions of said second set of data which correspond with said each acquisition of said first set of data; and
   grouping said corresponding acquisitions of said first and second sets of data in chronological order in accordance with said series of identifiers.

2. A method in accordance with claim 1 wherein said first set of data is a set of binary codes representative of a set of instructions executed by a microprocessor, and said second set of data is binary data produced by a monitored system.

3. A method in accordance with claim 2 wherein said identifiers are counts produced by a counter in response to each of said binary codes, and wherein said associating step comprises labeling each of said binary codes and binary data corresponding with each of said binary codes with a count.

4. A method in accordance with claim 3 wherein said chronological order grouping step comprises, for each count, arranging in sequence said binary code followed by said binary data, each count being arranged in consecutive order thereby to provide time-aligned data.

5. A method in accordance with claim 4 further comprising the step of displaying said time-aligned data.

6. An apparatus for time aligning in chronological order a second set of data with a corresponding separately-generated first set of data, comprising:

means for acquiring said first set of data;

means for producing an identifier signal in response to each acquisition of said first set of data, wherein a consecutive series of identifier signals is produced;

means for acquiring said second set of data;

means for associating one or more acquisitions of said second set of data with each of said identifier signals such that each identifier signal is associated with corresponding acquisitions of said first and second sets of data; and means for grouping said corresponding acquisitons of said first and second sets of data in chronological order in accordance with said consecutive series of identifier signals.

7. An apparatus in accordance with claim 6 wherein said means for acquiring said first set of data is a first test instrument, and said first set of data is a set of binary codes representative of a set of instructions executed by a microprocessor; and further wherein said means for acquiring said second set of data is a second test instrument, and said second set of data is binary data produced by a monitored system.

8. An apparatus in accordance with claim 7 wherein said means for grouping corresponding acquisitions in chronological order comprises processing means which receives said binary codes, said binary data, and said identifier signals and arranges in sequence for each identifier signal an acquired binary code and acquired binary data corresponding therewith so as to provide time-aligned data.

9. An apparatus in accordance with claim 7 wherein said means for producing an identifier signal comprises a counter for producing a count signal in response to each of said binary codes.

10. An apparatus in accordance wih claim 9 further comprising means for displaying said time-aligned data.

* * * * *